(No Model.)
LeR. S. WHITE.
Manufacture of Boilers and other Vessels.
No. 235,834. Patented Dec. 21, 1880.
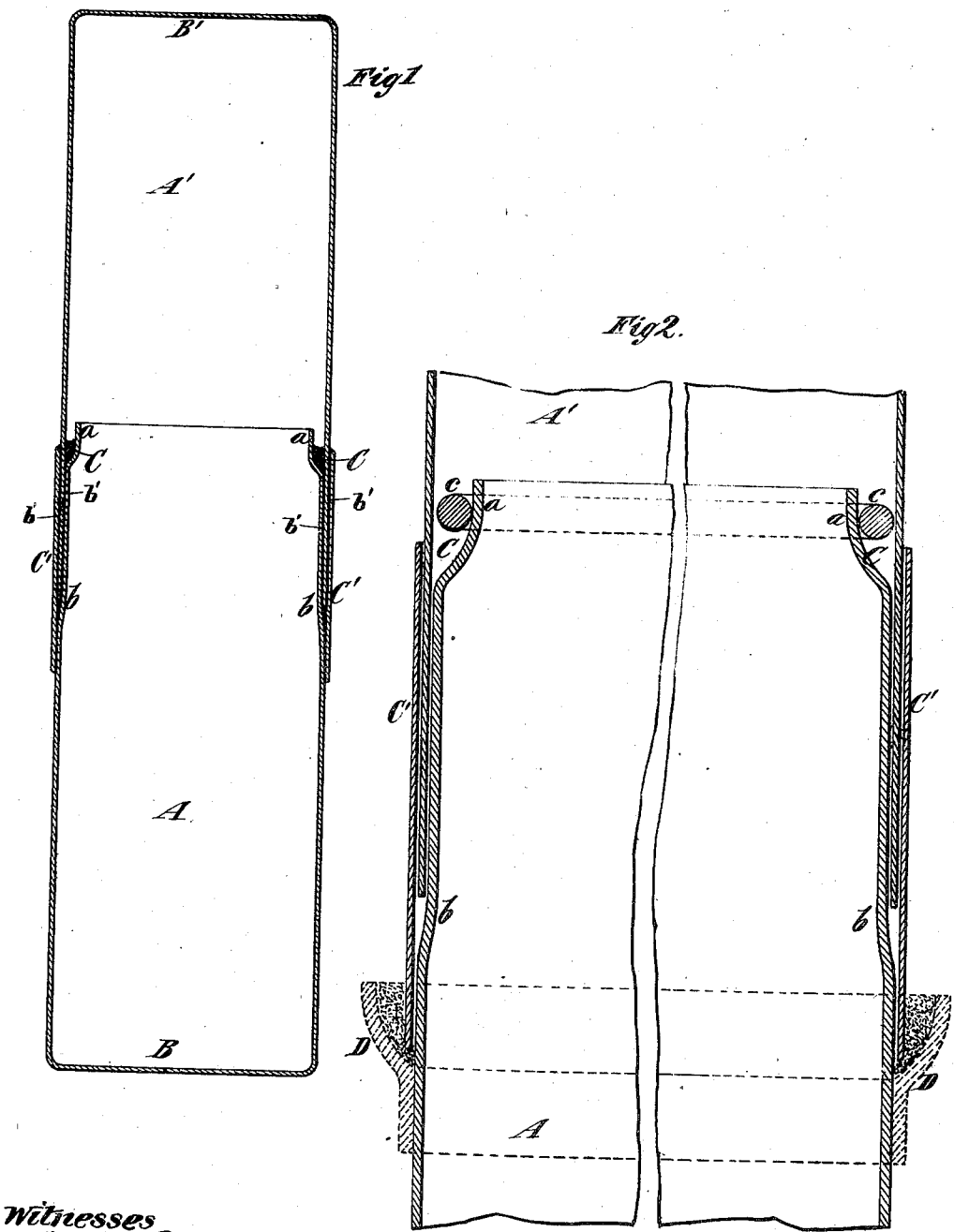

UNITED STATES PATENT OFFICE.

LE ROY S. WHITE, OF WATERBURY, CONNECTICUT, ASSIGNOR TO BROWN & BROTHERS, OF SAME PLACE.

MANUFACTURE OF BOILERS AND OTHER VESSELS.

SPECIFICATION forming part of Letters Patent No. 235,834, dated December 21, 1880.

Application filed October 14, 1880. (No model.)

*To all whom it may concern:*

Be it known that I, LE ROY S. WHITE, of Waterbury, in the county of New Haven and State of Connecticut, have invented certain new and useful Improvements in the Manufacture of Boilers and other Vessels, of which the following is a specification.

My invention relates particularly to kitchen-boilers of copper or brass, in which the cylindrical body portion of the boiler is made in two pieces, each of which has a head formed integral with it by drawing or otherwise, and in which the two said pieces are united by slipping one inside the other and soldering them together. Inasmuch as the heads are so formed it is impossible to have access to the interior of the boiler after the two parts have been placed together preparatory to joining them, and hence great difficulty is often experienced in properly applying the solder used to make this joint.

The object of this invention is to insure the filling of such a joint with solder, and thus enable a perfect joint to be produced without great skill or extraordinary care on the part of the workman.

To this end the invention consists in so contracting the inner end of the inner section that after its insertion into the outer section an annular channel or reservoir is formed within the outer section by such contraction, and in placing upon said contracted end before its insertion into the outer section a ring of solder, and in applying heat to the exterior of said outer section after the two sections are put together, to cause said ring of solder to melt in said channel or reservoir and run down therefrom between the two sections, thus forming a perfect joint.

In the accompanying drawings, Figure 1 represents a central vertical section of a boiler embodying my invention, and Fig. 2 represents a similar section of the joint upon a larger scale, the parts being broken in a vertical line to economize space.

Similar letters of reference designate corresponding parts in both the figures.

The boiler which I have represented is composed of two cylindric or tubular sections, A A', which have formed integral with them heads B B' by drawing up or otherwise shaping disks of copper in a manner now well known in the arts. To complete the boiler these two parts must be united by a joint at about the middle of the length of the boiler, and this joint is formed by constructing the sections so that one may be slipped inside the other, and then uniting the surfaces which are in contact by soldering. Inasmuch, however, as the two heads are made integral with the two sections, it will be understood that when the one section is slipped inside the other preparatory to soldering, access to the interior of the boiler is impossible, and hence it is difficult to properly apply the solder, and great care and watchfulness are required on the part of the workmen.

As clearly represented, the open end of the inner section, A, is considerably contracted or deflected inward at $a$, and at some little distance from the end is a much slighter contraction, $b$, so that when slipped together an annular reservoir or channel, C, for the solder will be formed and the exteriors of the two sections will be nearly in line with each other. Before the section A is slipped inside of the section A', I place upon the contracted end $a$ $a$ a ring of solder, $c$, the greatest diameter of which is a little less than the internal diameter of the section A', so that it will easily slip inside the latter. The section A is now slipped inside the section A', and if heat be applied equally all around the exterior of the boiler at the joint the solder will melt in the channel or reservoir C and run down all around the joint, as shown by black lines $b'$ in Fig. 1, and when it appears at the lower edge of the outer section, A', it will be sufficient evidence that the joint is properly and uniformly filled with solder. The heat may be applied to the boiler by inserting the boiler within a ring of gas-burners.

In order to increase the strength of the joint and also to enhance the appearance of the boiler, I place outside the boiler, opposite the joint, a ring or band, C', which overlaps the end of the outer section, A'.

In order to solder the inner surface of the ring or band C' to the surfaces of the sections A A', which are in contact therewith, I employ a divided ring or band, D, (represented in dotted outline in Fig. 2,) which may be clamped upon the boiler, and is made flaring at the top, so as to form an annular well or reservoir, in which sand is placed to cover the edge of the outer section, A'. The melted solder, being prevented by the sand from escaping at the bottom edge of the section A', is caused to flow upward between the outer section, A', and the interior of the band C', thus forming a perfect joint. When solder overflows at the top of the band C' it is conclusive evidence that the joint is well filled, and hence no great care or watchfulness on the part of the workman is necessary.

The ring D and the manner of using it form no part of my present invention, but may be made the subject of another application for Letters Patent.

Although my invention is only illustrated and described in connection with a boiler, it might be used in uniting cylindrical or tubular sections of other vessels.

The ring c c, of solder, may be of round or other transverse section.

What I claim as my invention, and desire to secure by Letters Patent, is—

The within-described method of joining the sections of tubular boilers or vessels, the same consisting in contracting the open end of one section, then placing around the exterior of said contracted end a solid ring of solder, then inserting this end of the inner section into outer section, and finally heating the outer section to melt the solder and cause it to pass between the two sections, all as herein set forth.

LE ROY S. WHITE.

Witnesses:
 G. H. CLOWES,
 FRANK PARTREE.